(12) United States Patent
Li (10) Patent No.: US 10,359,657 B2
(45) Date of Patent: Jul. 23, 2019

(54) DISPLAY FRAME AND DISPLAY

(71) Applicant: Shenzhen China Star Optoelectronics Technology Co., Ltd., Shenzhen, Guangdong (CN)

(72) Inventor: Quan Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 235 days.

(21) Appl. No.: 15/032,624

(22) PCT Filed: Feb. 18, 2016

(86) PCT No.: PCT/CN2016/074063
§ 371 (c)(1),
(2) Date: Apr. 27, 2016

(87) PCT Pub. No.: WO2017/124592
PCT Pub. Date: Jul. 27, 2017

(65) Prior Publication Data
US 2018/0052354 A1    Feb. 22, 2018

(30) Foreign Application Priority Data
Jan. 21, 2016  (CN) .......................... 2016 1 0041913

(51) Int. Cl.
*F16B 1/00*    (2006.01)
*G02F 1/13*    (2006.01)
(Continued)

(52) U.S. Cl.
CPC ...... *G02F 1/133308* (2013.01); *G02F 1/1335* (2013.01); *H01F 7/0252* (2013.01);
(Continued)

(58) Field of Classification Search
CPC ... G02F 1/133308; G02F 2001/133311; G02F 2001/133314; G02F 2001/133317;
(Continued)

(56) References Cited

U.S. PATENT DOCUMENTS

2009/0027583 A1    1/2009  McBroom
2012/0194761 A1*   8/2012  Nakano ............ G02F 1/133308
                                                  349/58
(Continued)

FOREIGN PATENT DOCUMENTS

CN            1549023 A    11/2004
CN            2724038 Y     9/2005
(Continued)

*Primary Examiner* — Jessica M Merlin
(74) *Attorney, Agent, or Firm* — Andrew C. Cheng (57) ABSTRACT

The present invention discloses a display frame, comprising a main frame body and a front frame body, and a plurality of magnets are separately adhered at edges of the main frame body, and front frame body is connected with the main frame body with magnetic attractive forces among the front frame body and the plurality of magnets; the main frame body and the front frame body jointly enclosure a first storage cavity, and the main frame body comprises a backlight window right opposite to a position of the first storage cavity, and the front frame body comprises a display window right opposite to a position of the first storage cavity. The display frame of the present invention can quickly change the display panel. The present invention further discloses a display applied with the display frame.

14 Claims, 6 Drawing Sheets

(51) Int. Cl.
*H01F 7/02* (2006.01)
*G02F 1/1333* (2006.01)
*G02F 1/1335* (2006.01)

(52) U.S. Cl.
CPC .... *F16B 2001/0035* (2013.01); *G02F 1/1309* (2013.01); *G02F 2001/13332* (2013.01); *G02F 2001/133314* (2013.01); *G02F 2001/133325* (2013.01)

(58) Field of Classification Search
CPC .......... G02F 2001/13332; G02F 2001/133322; G02F 2001/133325; G02F 2001/133328; G02F 2001/133331; G02F 1/1335; G02F 1/1309; G02F 1/133608; H01F 7/0252; F16B 2001/0035
See application file for complete search history.

(56) References Cited

U.S. PATENT DOCUMENTS

| | | | |
|---|---|---|---|
| 2013/0329160 A1* | 12/2013 | Tang | G02F 1/133308 349/58 |
| 2014/0176869 A1* | 6/2014 | Lee | G02F 1/133615 349/65 |
| 2014/0189982 A1* | 7/2014 | Li | A44B 99/00 24/303 |
| 2016/0011633 A1* | 1/2016 | Watanabe | G02F 1/1333 345/184 |

FOREIGN PATENT DOCUMENTS

| | | | |
|---|---|---|---|
| CN | 102200154 | * | 9/2011 |
| CN | 102200154 A | | 9/2011 |
| CN | 102354063 A | | 2/2012 |
| CN | 102608788 A | | 7/2012 |
| CN | 102692741 A | | 9/2012 |
| CN | 103901661 A | | 7/2014 |
| CN | 104965335 A | | 10/2015 |
| KR | 20080001929 A | | 1/2008 |

* cited by examiner

DISPLAY FRAME AND DISPLAY

CROSS REFERENCE

This application claims the priority of Chinese Patent Application No. 201610041913.7, entitled "Display frame and display", filed on Jan. 21, 2016, the disclosure of which is incorporated herein by reference in its entirety.

FIELD OF THE INVENTION

The present invention relates to a display technology field, and more particularly to a display frame and a display applied with the display frame.

BACKGROUND OF THE INVENTION

In the liquid crystal display according to prior art, the liquid crystal display panel is generally located on the backlight module, and the backlight module provides the positioning mechanism of the liquid crystal display panel and the fixture mechanism of the driving board at the same time. Then, with the front frame of the liquid crystal display, the liquid crystal display panel is locked to be fixed on the backlight module. When the liquid crystal display panel is damaged or the display fault happens and the liquid crystal display panel needs to be replaced. The procedure of replacing the liquid crystal display panel is more complicated (for instance, the backlight module has to be disassembled at the same time). Therefore, it is common for return to factory for replacement. The replacement efficiency is low and the cost is high.

SUMMARY OF THE INVENTION

An objective of the present invention is to provide a display frame which can quickly change the display panel, and a display applied with the display frame.

For realizing the aforesaid objective, the technical solution utilized by the embodiments of the present invention is:

First, disclosed is a display frame, comprising a main frame body and a front frame body, and a plurality of magnets are separately adhered at edges of the main frame body, and front frame body is connected with the main frame body with magnetic attractive forces among the front frame body and the plurality of magnets;

the main frame body and the front frame body jointly enclosure a first storage cavity, and the main frame body comprises a backlight window right opposite to a position of the first storage cavity, and the front frame body comprises a display window right opposite to a position of the first storage cavity.

The backlight window is right opposite to the display window, and an area of the backlight window is the same as an area of the display window.

The main frame body comprises a plurality of limiting blocks, and the plurality of limiting blocks are separately distributed at periphery of the backlight window.

Material of the front frame body is stainless.

Glue or a double side tape is positioned between the plurality of magnets and the main frame body.

The main frame body and the front frame body jointly enclosure a second storage cavity, and the second storage cavity is adjacent to the first storage cavity.

The front frame body comprises a convex part, and the convex part is right opposite to the second storage cavity, and the convex part protrudes toward a direction away from the main frame body.

The convex part comprises an electric window, and the electric window make the second storage cavity communicate with an outside of the display frame.

The display frame further comprises a rear frame body, and the read frame body is connected to the main frame body, and the rear frame body and the front frame body are respectively located at two sides of the main frame body, and the rear frame body and the main frame body jointly enclosure a third storage cavity, and the backlight window communicates with the first storage cavity and the third storage cavity.

Second, further provided is a display, comprises any of the aforesaid display frames and the display panel. The display panel is located in the first storage cavity, and a display region of the display panel is right opposite to the display window.

Compared with prior art, the present invention possesses benefits below:

When the display frame of the present invention is employed to install the display panel for constructing the display, the display panel is jointly fixed by the main frame body and the front frame body. Therefore, the display panel can be quickly replaced only by disassembling the front frame body. Meanwhile, the front frame body and the main frame body are connected with each other with the magnetic attractive forces (i.e. the magnetic attractive forces of the plurality of magnets to the front frame body). Thus, it is easy to disassemble the front frame body from the main frame body or to assemble the front frame body to the main frame body. The operation can be repeated without damaging the main frame body and the front frame body.

The display of the present invention utilizes the display frame. Therefore, the display panel can be quickly replaced.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
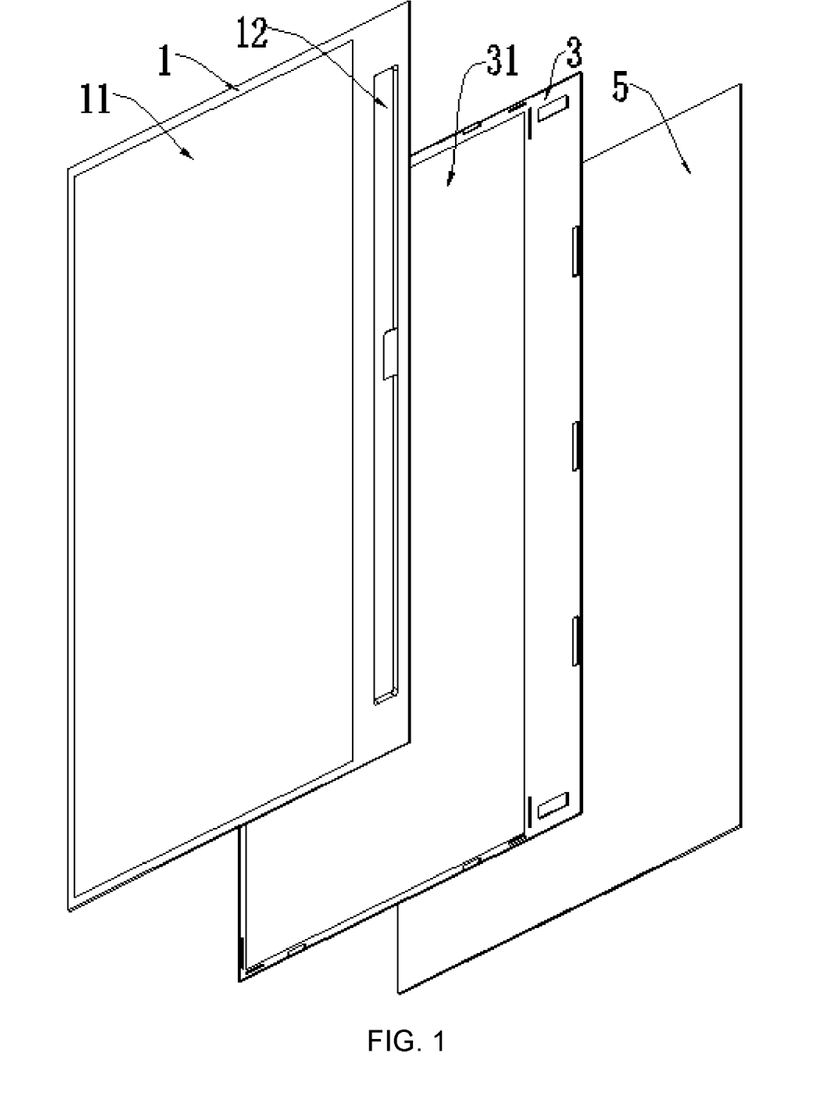
FIG. 1 is an exploded diagram of a display frame provided by the embodiment of the present invention.
Figure 2:
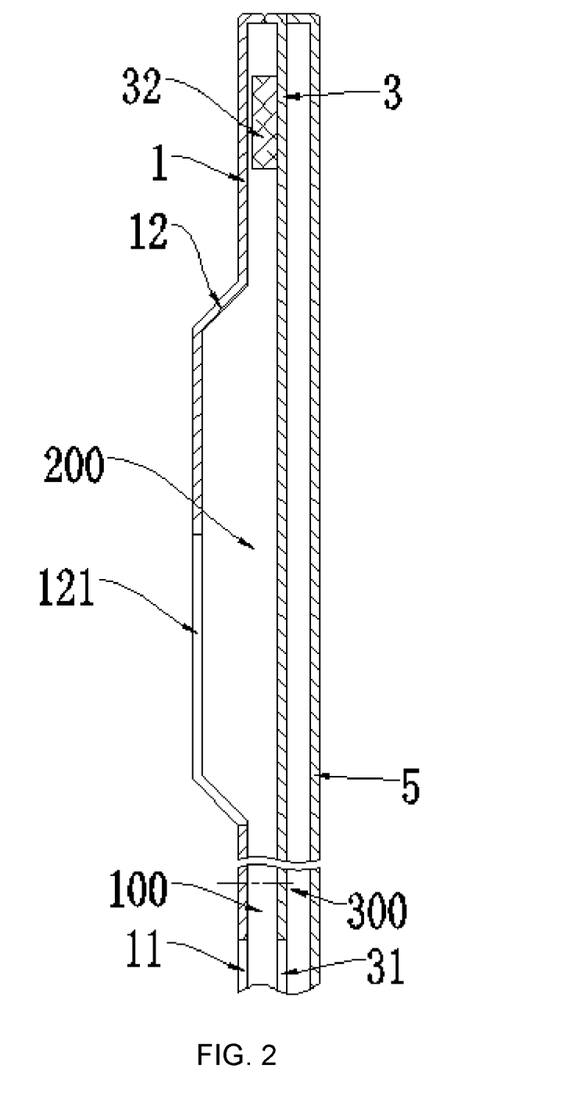
FIG. 2 is a partial structure diagram of a display frame provided by the embodiment of the present invention.

Please refer to FIG. 1 and FIG. 2. The embodiment of the present invention provides a display frame, comprising a main frame body 3 and a front frame body 1, and a plurality of magnets 32 are separately adhered at edges of the main frame body 3, and front frame body 1 utilizes the metal material and is connected with the main frame body 3 with magnetic attractive forces among the front frame body 1 and the plurality of magnets 32. The main frame body 3 and the front frame body 1 jointly enclosure a first storage cavity 100, and the main frame body 3 comprises a backlight window 31 right opposite to a position of the first storage cavity 100, and the front frame body 1 comprises a display window 11 right opposite to a position of the first storage cavity 100.

Please refer to FIG. 1, FIG. 2, FIG. 5 and FIG. 6. The display frame is employed to assemble the display panel 21 to construct the display. The first storage cavity 100 is employed to locate the display panel 21, and a display region 210 of the display panel 21 is right opposite to the display window 11.

When the display frame of the embodiment is employed to assemble the display panel 21 to construct the display, the display panel 21 is located in the first storage cavity 100, and the light penetrates the backlight window 31 to enter the display panel 21, and illuminates from the display window 11 after being changed in the display panel 21 for achieving the display function of the display. Then, the display panel 21 is jointly fixed with the main frame body 3 and the front frame body 1. Thus, the display panel 21 can be quickly replaced only by disassembling the front frame body 1. Meanwhile, the front frame body 1 and the main frame body 3 are connected with each other with the magnetic attractive forces (i.e. the magnetic attractive forces of the plurality of magnets 32 to the front frame body 1). Thus, it is easy to disassemble the front frame body 1 from the main frame body 3 or to assemble the front frame body 1 to the main frame body 3. The operation can be repeated without damaging the main frame body 3 and the front frame body 1.

It should be understood that in the embodiment, material of the front frame 1 is generally attractive material to the magnets 32, such as metal.

Furthermore, referring to FIG. 2, the backlight window 31 is right opposite to the display window 11, and an area of the backlight window 31 is the same as an area of the display window 11.

Please refer to FIG. 1, FIG. 2, FIG. 5 and FIG. 6. Preferably, the center of the backlight window 31 is aligned with the center of the display window 11, and as the display panel is assembled in the first storage cavity 100, the center of the display region 210 and the center of the backlight window 31 are aligned with the center of the display window 11. Meanwhile, the area of the backlight window 31 and the area of the display window 11 are larger than or equal to an area of the display region 210 of the display panel 21. Then, the display panel 21 can show itself entirely.

Figure 3:
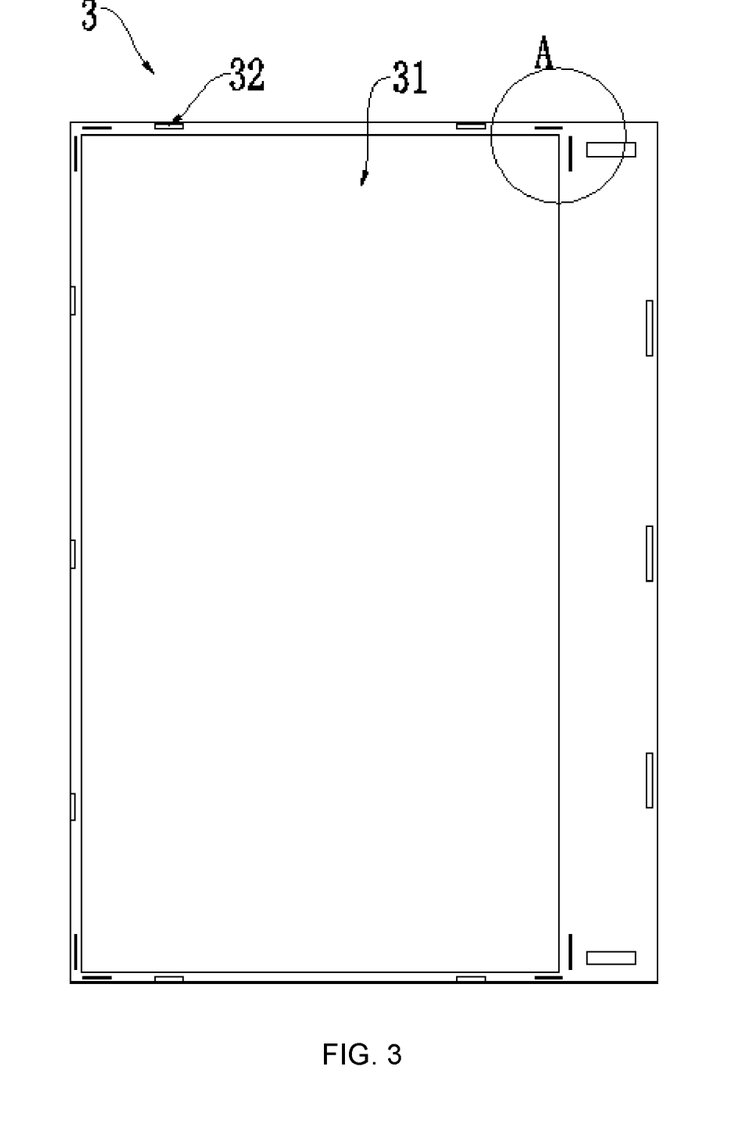
FIG. 3 is a front view diagram of a main frame body of a display frame provided by the embodiment of the present invention.
Figure 4:
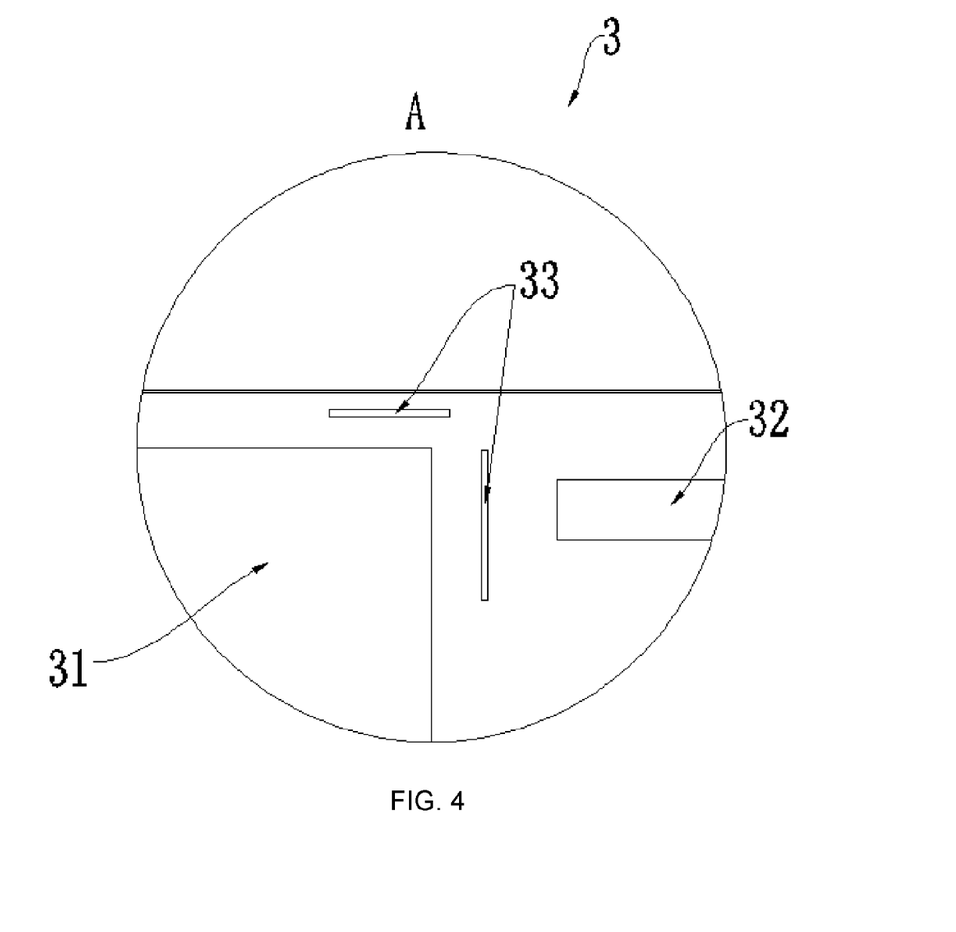
FIG. 4 is an enlarged diagram of the structure of A position in FIG. 3.

Furthermore, referring to FIG. 3 and FIG. 4, the main frame body 3 comprises a plurality of limiting blocks 33, and the plurality of limiting blocks 33 are separately distributed at periphery of the backlight window 31. When the display panel 21 is located in the first storage cavity 100, the display panel 21 is fixed by the plurality of limiting blocks 33 so that the display region 210 of the display panel 21 is right opposite to the backlight window 31 and the display window 11.

In the embodiment, periphery of the backlight window 31 means the regions connecting edges of the backlight window 31, and the plurality of limiting blocks 33 can be located adjacent to the edges of the backlight window 31, or can be located with a small gap from the edges of the backlight window 31. The periphery of the backlight window 31 generally comprises four edges, and the plurality of limiting blocks 33 are uniformly distributed at the four edges. Please refer from FIG. 1 to FIG. 3 and FIG. 5. When the display panel 21 is located in the first storage cavity 100, each edge of the display panel 21 is positioned by plurality of limiting blocks 33. The specific amount of the plurality of limiting blocks 33 is adjusted according to the size of the display panel 21. The plurality of limiting blocks 33 can be formed on the main frame body 3 in one body, or can be adhered and assembled on the main frame body 3 thereafter.

Furthermore, material of the front frame body 1 is stainless, and thus, the front frame body 1 is easily attracted by the magnets 32. The mass of the front frame 1 is small, and the amount of the magnets 32 can be properly decreased. Glue or a double side tape is positioned between the plurality of magnets 32 and the main frame body 1. The Glue or the double side tape can make the adhesive force among the plurality of magnets 32 and the main frame body 3 larger than the magnetic attractive forces among the plurality of magnets 32 and the front frame body 1. As disassembling the front frame body 1, the plurality of magnets 32 remain to be fixed on the main frame body 3. The main frame 3 also can select the metal material, such as the stainless material, which can increase the magnetic attractive forces among the main frame body 3 and the magnets 32. Furthermore, the plurality of magnets 32 are separately distributed on the main frame body 3, and the volumes and the amount of the magnets 32 can be adjusted and designed according to the structures and volumes of the main frame body 3 and the front frame body 1.

Furthermore, referring to FIG. 1 and FIG. 2, the main frame body 3 and the front frame body 1 jointly enclosure a second storage cavity 200, and the second storage cavity 200 is located adjacent to the first storage cavity 100. Namely, the second storage cavity 200 and the first storage cavity 100 are roughly aligned side by side.

Please refer to FIG. 1, FIG. 2, FIG. 5 and FIG. 6. As the display frame is employed to assemble the display panel 21 to construct the display, a driving board 22 is located in the second storage cavity 200 at the same time. Because the second storage cavity 200 and the first storage cavity 100 are aligned side by side, the replacements of the driving board 22 and the display panel 21 do not affect with each other, and can be executed individually to reduce the maintenance cost of the display utilizing the display frame.

Furthermore, referring to FIG. 1 and FIG. 2, the front frame body 1 comprises a convex part 12, and the convex part 12 is right opposite to the second storage cavity 200, and the convex part 12 protrudes toward a direction away from the main frame body 3.

Please refer to FIG. 1, FIG. 2, FIG. 5 and FIG. 6. As the driving board 22 is assembled in the second storage cavity 200, the convex part 12 makes the higher element 221 on the driving board 22 easily be located in the second storage cavity 200. In this embodiment, the convex part 12 comprises an electric window 121, and the electric window 121 is employed to locate the electric connector 222 of the driving board 22 to make the electric connector 222 communicate with an outside of the display frame. The position of the electric window 121 on the convex part 12 can be adjusted according to the structure of various driving board 22.

Furthermore, referring to FIG. 1 and FIG. 2, the display frame further comprises a rear frame body 5, and the read frame body 5 is connected to the main frame body 3, and the rear frame body 5 and the front frame body 1 are respectively located at two sides of the main frame body 3. The rear frame body 5 and the main frame body 3 jointly enclosure a third storage cavity 300, and the backlight window 31 communicates with the first storage cavity 100 and the third storage cavity 300.

Please refer to FIG. 1, FIG. 2, FIG. 5 and FIG. 6. As the display frame is employed to assemble the display panel 21 to construct the display, the third storage cavity 300 is employed to located the backlight module 4, and the light emitted by the backlight module 4 penetrates the backlight window 31 to enter the first storage cavity 100, i.e. the light emitted by the backlight module 4 enters the display region 210 of the display panel 21 to provide the backlight source for the display panel 21.

It should be understood that in the embodiment, the third storage cavity 300 also can be employed for accepting the other components. The structure of the rear frame body 5 and the structure of the third storage cavity 300 can have various designs according to the specific requirements, and are not limited to the appearances shown in the figures of the embodiment.

Figure 5:
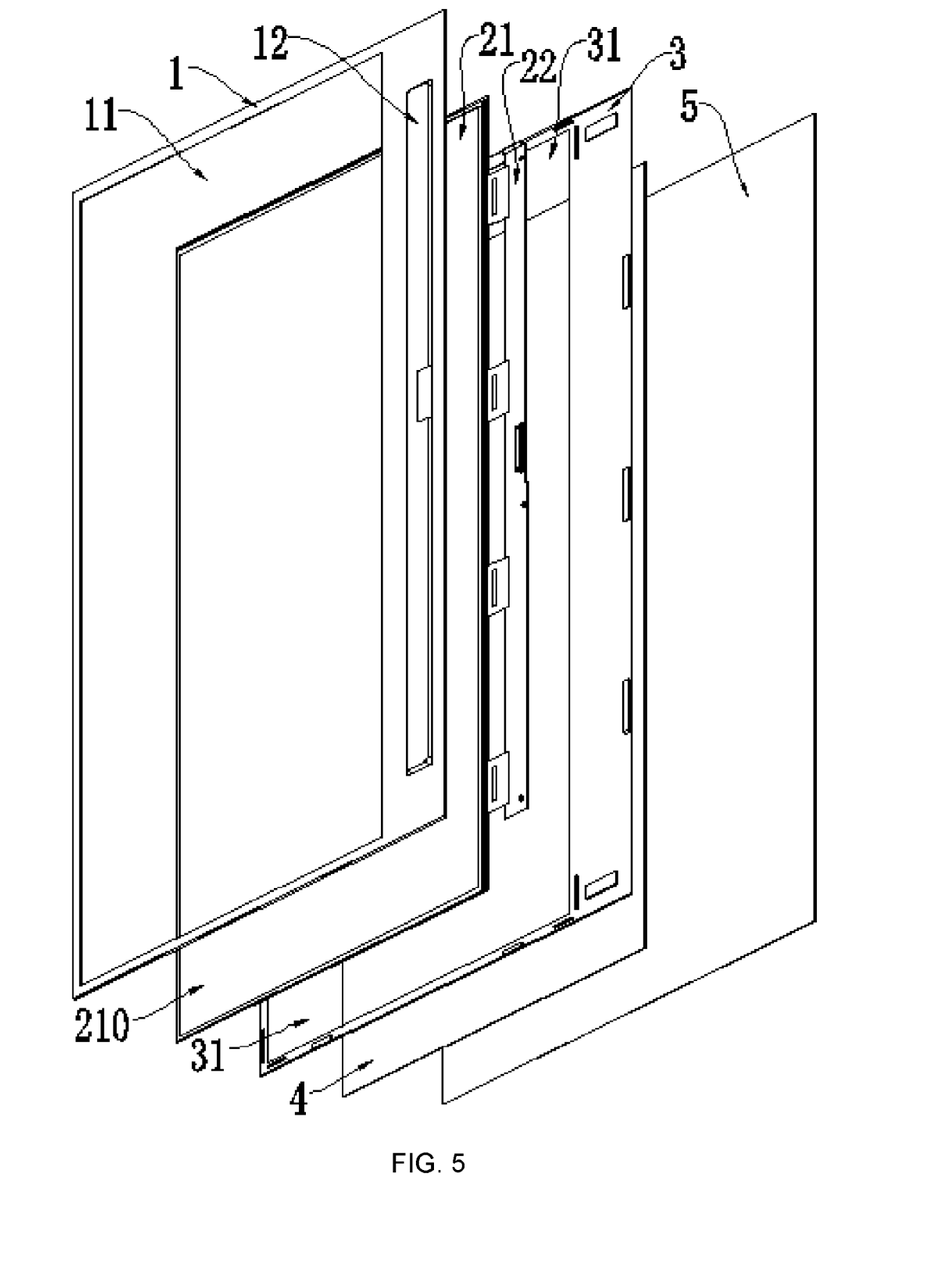
FIG. 5 is an exploded diagram of a display provided by the embodiment of the present invention.
Figure 6:
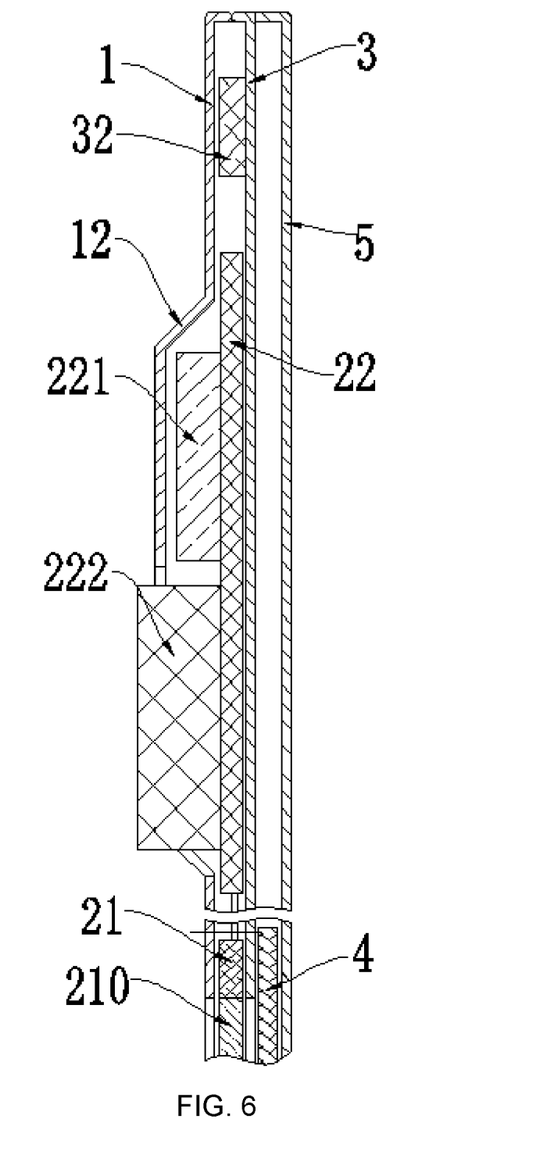
FIG. 6 is a partial structure diagram of a display provided by the embodiment of the present invention.

Please refer to FIG. 5 and FIG. 6. The present invention further provides a display, comprising the display frame in the aforesaid embodiment and the display panel 21. The display panel 21 is located in the first storage cavity 100, and the display region 210 of the display panel 21 is right opposite to the display window 11.

In the embodiment, as the display panel 21 is damaged, the display panel 21 can be quickly replaced only by disassembling the front frame body 1. Meanwhile, the front frame body 1 and the main frame body 3 are connected with each other with the magnetic attractive forces (i.e. the magnetic attractive forces of the plurality of magnets 32 to the front frame body 1). Thus, it is easy to disassemble the front frame body 1 from the main frame body 3 or to assemble the front frame body 1 to the main frame body 3. The operation can be repeated without damaging the main frame body 3 and the front frame body 1.

Furthermore, referring to FIG. 1, FIG. 2, FIG. 5 and FIG. 6, the display further comprises a driving board 22, and the driving board 22 is electrically coupled to the display panel 21. When the display frame forms the second storage cavity 200, the driving board 22 is located in the second storage cavity 200. Because the second storage cavity 200 and the first storage cavity 100 are aligned side by side, the replacements of the driving board 22 and the display panel 21 do not affect with each other, and can be executed individually to reduce the maintenance cost of the display.

Furthermore, referring to FIG. 5 and FIG. 6, the display further comprises a backlight module 4, and the backlight module is located at one side of the main frame body 3 away from the front frame body 1, and is right opposite to the backlight window 31 to provide the backlight module for the display panel 21. Please refer to FIG. 1, FIG. 2, FIG. 5 and FIG. 6. As the display frame comprises the rear frame 5, and the rear frame 5 and the main frame body 3 forms the third storage cavity 300, the backlight module 4 can be located in the third storage cavity 300. Then, the display panel 21 is no longer required to be fixed on the backlight module 4 to avoid the issue that the backlight module 4 needs to be disassembled while replacing the display panel 21.

The detail description has been introduced above for the embodiment of the invention. Herein, a specific case is applied in this article for explain the principles and specific embodiments of the present invention have been set forth. The description of the aforesaid embodiments is only used to help understand the method of the present invention and the core idea thereof; meanwhile, for those of ordinary skill in the art, according to the idea of the present invention, there should be changes either in the specific embodiments and applications but in sum, the contents of the specification should not be limitation to the present invention.

What is claimed is:

1. A display frame, comprising a main frame body and a front frame body, and a plurality of magnets are separately adhered at edges of the main frame body, and front frame body is connected with the main frame body with magnetic attractive forces among the front frame body and the plurality of magnets;

the main frame body and the front frame body jointly enclosure a first storage cavity and a second storage cavity, and the main frame body comprises a backlight window right opposite to a position of the first storage cavity, and the front frame body comprises a display window right opposite to a position of the first storage cavity, and the front frame body comprises a convex part, and the convex part is right opposite to the second storage cavity, and the convex part protrudes toward a direction away from the main frame body, wherein a display panel is located in the first storage cavity, and a backlight module provides back light for the display panel through the backlight window, and a driving board of the display panel is located in the second storage cavity and the convex part, and the second storage cavity and the first storage cavity are aligned side by side, wherein the display panel is located in the first storage cavity and not fixed on the backlight module with the magnetic attractive forces of the plurality of magnets, and the driving board is located in the second storage cavity, wherein the display panel and the driving board are configured to be removable without disassembling the backlight module and removing the display panel, respectively, and replacement of the display panel is executable individually without disassembling the backlight module, and replacement of the driving board is executable individually without removing the display panel.

2. The display frame according to claim 1, wherein the backlight window is right opposite to the display window, and an area of the backlight window is the same as an area of the display window.

3. The display frame according to claim 1, wherein the main frame body comprises a plurality of limiting blocks, and the plurality of limiting blocks are separately distributed at periphery of the backlight window.

4. The display frame according to claim 1, wherein material of the front frame body is stainless.

5. The display frame according to claim 1, wherein glue or a double side tape is positioned between the plurality of magnets and the main frame body.

6. The display frame according to claim 1, wherein the convex part comprises an electric window, and the electric window make the second storage cavity communicate with an outside of the display frame.

7. The display frame according to claim 1, wherein the display frame further comprises a rear frame body, and the rear frame body is connected to the main frame body, and the rear frame body and the front frame body are respectively located at two sides of the main frame body, and the rear frame body and the main frame body jointly enclosure a third storage cavity, and the backlight window communicates with the first storage cavity and the third storage cavity.

8. A display, comprising a display frame and a display panel;
the display frame comprises a main frame body and a front frame body, and a plurality of magnets are separately adhered at edges of the main frame body, and front frame body is connected with the main frame body with magnetic attractive forces among the front frame body and the plurality of magnets;
the main frame body and the front frame body jointly enclosure a first storage cavity and a second storage cavity, and the main frame body comprises a backlight window right opposite to a position of the first storage cavity, and the front frame body comprises a display window right opposite to a position of the first storage cavity, and the front frame body comprises a convex part, and the convex part is right opposite to the second storage cavity, and the convex part protrudes toward a direction away from the main frame body, wherein the display panel is located in the first storage cavity, and a backlight module provides back light for the display panel through the backlight window, and a driving board of the display panel is located in the second storage cavity and the convex part, and the second storage cavity and the first storage cavity are aligned side by side, wherein the display panel is located in the first storage cavity and the driving board is located in the second storage cavity and not fixed on the backlight module with the magnetic attractive forces of the plurality of magnets, wherein the display panel and the driving board are configured to be removable without disassembling the backlight module and removing the display panel, respectively, and replacement of the display panel is executable individually without disassembling the backlight module, and replacement of the driving board is executable individually without removing the display panel;
the display panel is located in the first storage cavity, and a display region of the display panel is right opposite to the display window.

9. The display according to claim 8, wherein the backlight window is right opposite to the display window, and an area of the backlight window is the same as an area of the display window.

10. The display according to claim 8, wherein the main frame body comprises a plurality of limiting blocks, and the plurality of limiting blocks are separately distributed at periphery of the backlight window.

11. The display according to claim 8, wherein material of the front frame body is stainless.

12. The display according to claim 8, wherein glue or a double side tape is positioned between the plurality of magnets and the main frame body.

13. The display according to claim 8, wherein the convex part comprises an electric window, and the electric window make the second storage cavity communicate with an outside of the display frame.

14. The display according to claim 8, wherein the display frame further comprises a rear frame body, and the rear frame body is connected to the main frame body, and the rear frame body and the front frame body are respectively located at two sides of the main frame body, and the rear frame body and the main frame body jointly enclosure a third storage cavity, and the backlight window communicates with the first storage cavity and the third storage cavity.

* * * * *